United States Patent [19]
Csillag et al.

[11] Patent Number: 4,828,617
[45] Date of Patent: May 9, 1989

[54] PRIMING AND BODY PAINT HAVING AN ACTIVE ANTI-CORROSIVE AND SURFACE CLEANING EFFECT

[75] Inventors: Zsolt Csillag; Tibor Kálmán; László Zsembery; Géza Szentgyörgyi; György Keébe; Éva Hidvégy; Károly Sol már, all of Budapest, Hungary

[73] Assignee: Magyar Aluminiumipari Troszt, Budapest, Hungary

[21] Appl. No.: 1,364

[22] Filed: Jan. 8, 1987

[30] Foreign Application Priority Data

Jan. 14, 1986 [HU] Hungary ................................ 172/86

[51] Int. Cl.⁴ ........................... C09D 3/00; C09C 1/62; C09C 1/22
[52] U.S. Cl. .................................. 106/14.34; 106/403; 106/404; 106/456; 106/462; 106/463
[58] Field of Search .................. 106/14.34, 306, 18.24, 106/288 Q, 14.25, 288 B, 253, 403, 404, 456, 462, 463

[56] References Cited

U.S. PATENT DOCUMENTS

| | | | |
|---|---|---|---|
| 3,268,295 | 8/1966 | Armbrust et al. | 106/288 B |
| 3,477,865 | 11/1969 | Armbrust et al. | 106/204 |
| 3,565,656 | 2/1971 | Allen et al. | 106/288 B |
| 3,960,611 | 6/1976 | Walker et al. | 106/288 B |

OTHER PUBLICATIONS

Advanced Inorganic Chemistry, Cotton et al., 1972, p. 215.

*Primary Examiner*—Paul Lieberman
*Assistant Examiner*—Helene Kirschner
*Attorney, Agent, or Firm*—Birch, Stewart, Kolasch & Birch

[57] ABSTRACT

The present invention relates to a priming or body paint having active anti-corrosive and surface cleaning effect containing binding material, pigment and optionally solvent, filler and/or additives, characterized in that said pigment, optionally in addition to other known pigments, comprises:

(a) 30–70% parts by weight, preferably 40–55% by weight of alumina hydrate (Al/OH/$_3$), (b) 20–55% by weight of at least of one of atoxic oxides, hydroxides, oxide hydroxides, carbonates or phosphates of amphoteric elements or metals of variable valency possessing less valency than the maximum, in case of aluminum the oxide or hydroxide thereof, (c) 0–50% by weight, preferably 2–15% by weight of calcium and/or magnesium carbonate, and the grain size thereof is <20 μm, preferably 2–10 μm.

23 Claims, No Drawings

PRIMING AND BODY PAINT HAVING AN ACTIVE ANTI-CORROSIVE AND SURFACE CLEANING EFFECT

FIELD OF THE INVENTION

The present invention relates to a priming and body paint (color) having an active anti-corrosive and surface cleaning effect. The paint according to the present invention is useful first of all for the protection of surfaces exposed to intensive corrosion and which can readily be applied to the surface to be protected by any common technology without endangering health.

BACKGROUND OF THE INVENTION

Among the known anti-corrosive materials, red lead (minium) and chromates were considered to be the most convenient ones to use. The advantage of red lead is its good anti-corrosive effect, but the drawback thereof is the slow drying capacity and its harmfulness when producing and applying it. HUP No. 166,848 describes an anti-corrosive red lead-containing paste. The chromates used as anti-corrosive materials are also considered to be very toxic.

SUMMARY OF THE INVENTION

The aim of the present invention is to provide a paint, an anti-corrosive effect of which is at least the same as known ones, but which is unharmful to the health and environment, and which can be applied by any usual method.

It was found that the above goals can be achieved, and a superior anti-corrosive effect can be ensured, using a paint containing binding material, pigment, optionally solvents, fillers and/or additives and in which the pigment, optionally in addition to other known pigments, comprises:

(a) 30–70% by weight, preferably 40–55% by weight, of alumina hydrate $Al(OH)_3$,
(b) 20–55% by weight of at least one of atoxic oxides, hydroxides, oxide hydroxides, carbonates or phosphates of amphoteric elements or of metals of variable valency possessing less valency than the maximum value, and in the case of aluminum, the oxide or oxide hydroxide thereof, and
(c) 0–50% by weight, preferably 2–15% by weight, of calcium or magnesium carbonate and has a grain size of <20 μm, preferably of 2–10 μm.

The paint according to the present invention contains the above pigment in an amount of 55–88%, preferably of 65–75% by weight.

In accordance with the present invention the term "atoxic compound" means that the compounds in question combined with alumina hydrate in the above mentioned ratio in pigments and used in the priming and body color, respectively in the usual ratio, are not harmful to the health whatever the method of their application to the surface to be protected.

Preferred paints according to the present invention contain pigments, optionally in addition to other known pigments, which comprise:

(a) 30–70% by weight of alumina hydrate,
(b) 20–45% by weight of siderite bauxite or 20–45% by weight of a mixture containing bauxite free from siderite and 5–20% by weight, preferably 5–10% by weight of siderite and/or siderite iron ore, and 0–10% by weight of oxidic manganese ore, and
(c) 0–50% by weight, preferably 2–15% by weight of limestone, chalk, and/or dolomite, or a ground mixture of synthetic materials corresponding to the above ores and having a grain size of <20 μm, preferably 2–10 μm, and further comprise alumina (alum earth) as filler, optionally together with other known fillers.

As the alumina hydrate component the pigment of the paint according to the present invention comprises advantageously alumina hydrate produced by the Bayer process. Namely the weak alkality of the NaOH inclusion formed in the course of the process is advantageous from the point of view of corrosion protection. If a white paint is required it is preferred to use carbonized alumina hydrate in certain amount. This amount may range up to 60% by weight of the lot.

The pigment of the paint according to the invention comprises advantageously the compounds of metals which form equally stable oxides, hydroxides and oxide hydroxides as component (b). Such metals are primarily aluminum, iron and manganese the compounds of which are particularly advantageous in the paints according to the invention. The compounds of these metals may also be used individually, however, the paints comprising the mixture of compounds of aluminum, iron and manganese are preferred.

In addition to the foregoing the pigment of the paint according to the present invention may also comprise the above determined compounds of any other amphoteric elements, e.g. zinc or any other metal of variable valency, e.g. tin, cobalt or copper.

The compounds enumerated as component (b) may be industrially produced materials, possible industrial by-products or wastes, but, the natural mineral substances are preferred. These latter ones are of particular advantage if several kinds of compounds enumerated as components (b) are contained therein.

For component (b) of the pigment of the paint according to the present invention the following materials are considered to be of advantage: various kinds of bauxite, e.g. gibbsite, goethite, hematite and particularly siderite bauxites, moreover boehmite $AlO(OH)$, magnetite ($Fe_3O_4$), siderite ($FeCO_3$), lepidocrocite ($\gamma$-$FeO(OH)$), manganite $\gamma$-$MnO(OH)$, rhodocrosite ($MnCO_3$), pyrolusite ($\beta$-$MnO_2$) as well as zinc phosphate. Natural mineral substances which comprise compounds of several metals are also considered to be advantageous. Consequently for instance, jacobsite ($MnFe_2O_4$), franklinite ($ZnFe_2O_4$) or chromite ($FeCr_2O_4$) may also advantageously be used for components (b) of the pigment of the paint according to the present invention.

Paints are preferred having pigments which contain in addition to the aforementioned components (a) and (b) calcium and/or magnesium carbonate in an amount of 0–50% by weight, preferably 2–15% by weight. These compounds are preferably mineral substances too. As such compounds the paint composition contains preferably limestone, magnesite, dolomite, precipitated chalk or chalkstone or various mixtures thereof.

The grain size of the pigment is of importance from the point of view of the anti-corrosive effect of the paint according to the invention. The grain size of the pigment can be a max. of 20 μm. It is preferred, however, if the pigment comprises grains smaller than 10 μm, preferably those smaller than 5 μm. The production of fine grains of this kind needs an appropriate grinding operation.

The paint according to the invention may contain alumina as filler preferably in an amount of 0.1-1 part by weight calculated for 1 part by weight of the pigment. However, it should be noted that this component slightly reduces the anti-corrosive effect of the paint. In addition to the alumina the paint according to the invention may comprise other known fillers.

The binding materials of the paint according to the invention may be oil, synthetic resin (alkyl resin) or any kind of other known binding materials. Further, the paint according to the invention may contain other known additives which are of importance from the point of view of storage or application, e.g. wetting agents, plasticizers, catalysts or stabilizers.

The paint according to the invention can be prepared by the simple admixture of the components. The method and sequence of the admixture depends on the type of the paint to be prepared. The preparation of the paint according to the invention does not require any special technical apparatus; it can be prepared by any technology known in the paint industry.

The pigment material is preferably prepared in a way that preground products having a grain size of $<200$ $\mu$m, preferably $<160$ $\mu$m are, made from components (b) and (c) each. The preground products thus obtained and alumina hydrate are individually dried to contain moisture less than 1% by weight of each, and then they are admixed in a ratio required, homogenized and finally ground to a grain size of $<20$ $\mu$m, preferably of $<10$ $\mu$m.

The homogenization is carried out preferably in a homogenizator having spiral stirring arms and the grinding preferably in an air jet mill. As the components have about the same hardness, they get perfectly mixed during the fine grinding, and therefore there is no need for additional homogenization.

Alumina used as filler can optionally be added to the mixture of preground pigment materials and the mixture thus completed is homogenized and ground as described above.

The invention is illustrated by the following non-limiting Examples.

EXAMPLE 1

A priming paint of the following composition is prepared:
  45 parts by weight of alumina hydrate
  33 parts by weight of siderite bauxite (siderite content: 30% by weight)
  4 parts by weight of limestone
  18 parts by weight of linseed oil Siderite bauxite and limestone are individually ground to a grain size of $<200$ $\mu$m then they are mixed with the alumina hydrate and homogenized in a homogenizer having spiral stirring arms. Thereafter the homogeneous mixture thus obtained is ground in an air jet mill equipped with an air elutriator to a grain size of $<10$ $\mu$m. In the pregrinding chamber concentrated aqueous solution of cetyl pyridinium bromide is sprayed onto the surface of the substance to be ground.

Thereafter the fine ground pigment thus obtained is admixed with the linseed oil and the mixture is homogenized.

EXAMPLE 2

A priming paint of the following composition is prepared:
  16 parts by weight of alumina hydrate
  9 parts by weight of bauxite
  3 parts by weight of manganese ore (originated from Urkut)
  3 parts by weight of siderite
  4 parts by weight of dolomite
  30 parts by weight of linseed oil The ores are separately ground to a grain size of 160–200 $\mu$m then, admixed with the alumina hydrate and the mixture thus obtained is homogenized as described in Example 1 and ground to be fine. The paint is prepared as described in Example 1.

EXAMPLE 3

A priming paint of the following composition is prepared:
  40 parts by weight of alumina hydrate
  25 parts by weight of siderite bauxite (siderite content: 30% by weight)
  5 parts by weight of chalk
  10 parts by weight of alumina
  20 parts by weight of linseed oil The siderite bauxite and chalk are ground separately to a grain size of $<160$ $\mu$m and then mixed, and the mixture thus obtained is admixed with the alumina hydrate and alumina. Further one proceeds as described in Example 1.

EXAMPLE 4

A pigment material having the following composition is prepared as described in Example 1 for priming paints:
  100 parts by weight of alumina hydrate
  16 parts by weight of siderite
  8 parts by weight of pyrolusite
  36 parts by weight of dolomite The pigment composition thus obtained is used for preparing a priming paint having the following composition:
  95 parts by weight of pigment
  4.5 parts by weight of methyl cellosolve (solvent and curdling inhibitor)
  8 parts by weight of white spirit (solvent)
  12 parts by weight of linseed oil (binding material)
  1 part by weight of cobalt linoleate (siccative, Sicanol 6201, Budalakk Festék és Mügyantagyár)
  0.4 parts by weight of polydimethylsiloxane (water-repellent, Silorhab OR, Finomvegyszer Szövetkezet)
  4 parts by weight of carbon tetrachloride (flowing agent)
  4.5 parts by weight of toluene (flowing agent)
  0.1 parts by weight of aluminium-stearate (10% by weight in white spirit, sedimentatation inhibitor)

The above components are mixed and homogenized. The primer thus obtained possesses an excellent anti-corrosive effect in an aggressive and moist environment, applying. One hour after applying the paint becomes dry and a flexible, shockproof and wear-resistant coating is obtained.

EXAMPLE 5

A pigment material having the following composition is prepared as described in Example 1 for priming paint having the following composition:
  100 parts by weight of alumina hydrate
  66 parts by weight of bauxite
  16 parts by weight of siderite
  8 parts by weight of pyrolusite 20 parts by weight of limestone The pigment material thus obtained is used for a priming paint having the following composition:
- 80 parts by weight of pigment
- 12 parts by weight of white spirit (solvent)
- 9 parts by weight of linseed oil (binding material)
- 1 parts by weight of cobalt linoleate (siccative, Sicanol 6201)
- 4 parts by weight of accelerator FKI The accelerator FKI is prepared by mixing and homogenization of 5 parts by weight of MnO, 5 parts by weight of $CoSO_4$, 3.5 parts by weight of CaO, 2.5 parts by weight of zinc acetate and 2.5 parts by weight of $FeSO_4$ (all substances are of a grain size <5 μm), 70 parts by weight of linseed oil and 10 parts by weight of isooctanole. The mixture thus obtained is poured into a foam column and air is blased through it at 98°–100° C. for one hour.

The paint obtained by the homogenization of the above components becomes dry very quickly (within 15–20 minutes) and it is especially suitable for spraying.

EXAMPLE 6

A pigment material having the following composition is prepared as described in Example 1 for priming paint:
- 100 parts by weight of alumina hydrate (containing 50 parts by weight of carbonized alumina hydrate)
- 40 parts by weight of zinc phosphate
- 40 parts by weight of limestone The pigment material thus obtained is used for preparing a priming paint having the following composition:
- 75 parts by weight of pigment
- 15 parts by weight of white spirit (solvent)
- 10 parts by weight of linseed oil (binding material)
- 1 part by weight of accelerator FKI
- 1 part by weight of cobalt linoleate siccative (Sicanol 6201)

By admixing and homogenization of the above components an anti-corrosive paint having a white color is obtained.

EXAMPLE 7

A pigment material having the following composition is prepared as described in Example 1 for body paint:
- 40 parts by weight of hydrate (containing 60 parts by weight of carbonized alumina hydrate)
- 40 parts by weight of alumina
- 20 parts by weight of chalk The pigment material thus obtained is used for a body paint having the following composition:
- 75 parts by weight of pigment
- 15 parts by weight of white spirit (solvent)
- 10 parts by weight of linseed oil (binding material)
- 1 part by weight of accelerator FKI
- 1 part by weight of cobalt linoleate siccative (Sicanol 6201)
- 0.3 part by weight of polydimethylsiloxane (water-repellent Silorhab OR)
- 3 parts by weight of carbon tetrachloride (flowing agent)
- 3 parts by weight of toluene (flowing agent)
- 2 parts by weight of benzene (flowing agent)
- 0.1 part by weight of aluminum stearate (10% by weight in white spirit, sedimentation inhibitor)

The paint is obtained by admixing and homogenization of the above components. The body paint thus obtained is suitable for preparing a uniform, bright coating.

EXAMPLE 8

Pigment material having the following composition is prepared as described in Example 1 for a body paint:
- 30 parts by weight of alumina hydrate
- 50 parts by weight of $Fe_2O_3$
- 20 parts by weight of dolomite By the use of the above pigment and the components listed in Example 7 a body paint is prepared. After the admixture and homogenization of the components a red body paint is obtained having a good flowing capacity and capable of forming a uniform coating.

The advantage of the paint according to the invention is that the anti-corrosive effect thereof is superior to the red lead and to the other known anti-corrosive paints. It stops corrosion of the surface to be protected, and moreover, it removes the products of the corrosion from the surface after a certain period of time. A further advantage thereof is that it contains no substances which are harmful to the health. Accordingly it can be applied to the surfaces to be protected by any known method, e.g., by spreading.

What we claim is:

1. A priming or body paint having an anti-corrosive and a surface cleaning effect comprising binding material, and a pigment, wherein said pigment comprises:
   (a) 30–70% parts by weight of alumina hydrate Al(OH)$_3$;
   (b) 20–55% by weight of at least one member selected from the group consisting of atoxic oxides, hydroxides, oxide hydroxides, carbonates or phosphates of amphoteric elements selected from the group consisting of iron, manganese, and aulminum, said iron and manganese possessing less valency than the maximum, and said aluminum being the oxide or oxide hydroxide thereof; and
   (c) up to 50% by weight of calcium carbonate, magnesium carbonate, or mixtures thereof, and the grain size thereof is <20 μm.

2. A paint as claimed in claim 1, which further comprises alumina as a filler.

3. A priming or body paint having an anti-corrosive and a surface cleaning effect comprising binding material and a pigment, wherein said pigment comprises:
   (a) 30–70% by weight by weight of alumina hydrate Al(OH)$_3$;
   (b) 20–45% by weight of siderite bauxite or 20–45% by weight of a mixture containing bauxite free from siderite and 5–20% by weight of siderite and/or siderite iron ore, and up to 10% by weight of oxidic manganese ore;
   (c) up to 50% by weight of at least one member selected from the group consisting of limestone, chalk, dolomite, and a ground mixture of synthetic materials corresponding to the composition of the above ores;
   and the grain size thereof is <20 μm; and alumina is present as a filler.

4. A paint as claimed in any of claims 1 or 2, wherein the pigment comprises alumina hydrate obtained by the Bayer process as component (a).

5. A paint as claimed in any of claims 1 or 2 wherein the component (a) of the pigment comprises carbonized alumina hydrate in an amount of up to 60% by weight of the total amount of alumina hydrate.

6. A paint as claimed in any one of claims 1 or 2 wherein the pigment comprises limestone, dolomite, magnesite, precipitated chalk or chalkstone or a mixture thereof as component (c).

7. A paint as claimed in claim 3, wherein the pigment comprises alumina hydrate obtained by the Bayer process as component (a).

8. A paint as claimed in claim 3, wherein the component (a) of the pigment comprises carbonized alumina hydrate in an amount of up to 60% by weight of the total amount of alumina hydrate.

9. A paint as claimed in claim 4, wherein the component (a) of the pigment comprises carbonized alumina hydrate in an amount of up to 60% by weight of the total amount of alumina hydrate.

10. A paint as claimed in claim 3 wherein said pigment comprises at least one compound of metals capable of forming equally stable oxides, hydroxides and oxide hydroxides as component (b).

11. A paint as claimed in claim 3 wherein said pigment comprises a compound of alumina, iron and/or manganese as component (b).

12. A paint as claimed in claim 3 wherein the pigment comprises natural mineral substances as component (b).

13. A paint as claimed in claim 3 wherein a pigment comprises limestone, dolomite, magnesite, precipitated chalk or chalkstone or the mixture thereof as component (c).

14. A paint as claimed in claim 4 wherein a pigment comprises limestone, dolomite, magnesite, precipitated chalk or chalkstone or the mixture thereof as component (c).

15. A paint as claimed in claim 5 wherein a pigment comprises limestone, dolomite, magnesite, precipitated chalk or chalkstone or the mixture thereof as component (c).

16. A paint as claimed in claim 1, wherein said pigment contains, as component (a), 40-55% by weight of alumina hydrate.

17. A paint as claimed in claim 1, wherein said pigment further comprises, as component (c), 2-15% by weight of calcium and/or magnesium carbonate.

18. A paint as claimed in claim 1, wherein the grain size is in the range of 2-10 $\mu$m.

19. A paint as claimed in claim 1, further comprising at least one member selected from the group consisting of solvents, fillers, and additives.

20. A paint as claimed in claim 3, wherein said pigment contains, as component (a), 40-55% by weight of alumina hydrate.

21. A paint as claimed in claim 3, wherein said pigment contains, as component (b), 5-10% by weight of siderite and/or siderite iron ore.

22. A paint as claimed in claim 3, which contains 2-15% by weight of component (c).

23. A paint as claimed in claim 3, wherein the grain size is 2-10 $\mu$m.

* * * * *